(12) United States Patent
Westerveld et al.

(10) Patent No.: US 8,472,624 B2
(45) Date of Patent: Jun. 25, 2013

(54) GENERATING A SCRAMBLED DATA STREAM

(75) Inventors: Egbert Westerveld, Hoofddorp (NL); Vladimir Zivkovic, Hoofddorp (NL)

(73) Assignee: Irdeto B.V. (NL)

(*) Notice: Subject to any disclaimer, the term of this patent is extended or adjusted under 35 U.S.C. 154(b) by 109 days.

(21) Appl. No.: 12/964,876

(22) Filed: Dec. 10, 2010

(65) Prior Publication Data
US 2011/0317833 A1 Dec. 29, 2011

(30) Foreign Application Priority Data
Dec. 11, 2009 (EP) .................................... 09178971

(51) Int. Cl.
*H04N 7/167* (2011.01)

(52) U.S. Cl.
USPC ............ 380/210; 380/212; 380/217; 380/239

(58) Field of Classification Search
USPC ................... 380/46, 210, 225, 212, 239, 262, 380/273, 28–29, 200–202, 217, 241; 713/189; 726/26
See application file for complete search history.

(56) References Cited

U.S. PATENT DOCUMENTS

| | | | |
|---|---|---|---|
| 4,839,724 A * | 6/1989 | Keesen et al. ............ 375/240.12 |
| 7,321,910 B2 * | 1/2008 | Crispin et al. ................ 708/231 |
| 2008/0137850 A1 | 6/2008 | Mamidwar | |
| 2009/0044231 A1 * | 2/2009 | Oh et al. ......................... 725/62 |

* cited by examiner

*Primary Examiner* — Hosuk Song
(74) *Attorney, Agent, or Firm* — Hayes Soloway P.C.

(57) ABSTRACT

A method and a system for generating a scrambled data stream is described, wherein the method comprises: providing a code book comprising code information for scrambling data in data stream comprising one or more service streams; generating a control word request associated with at least one crypto period in at least one of said service streams; in response to said control word request, generating on the basis of said code information at least one control word associated with said crypto period in said service stream; and, scrambling data associated with at least one of said service streams using said control word.

30 Claims, 10 Drawing Sheets

GENERATING A SCRAMBLED DATA STREAM

CLAIM OF PRIORITY

The present patent application claims the benefit of priority under 35 U.S.C. §119 to European Patent Application (EPO) No. 09178971.9, filed Dec. 11, 2009, the entire contents of which are incorporated herein by reference.

FIELD OF THE INVENTION

The invention relates to generating a scrambled data stream and, in particular, though not necessarily, to a method and a system for generating a scrambled data stream, a control word generator, a crypto period controller and data structures for use in such system, and a computer product program using such method.

BACKGROUND OF THE INVENTION

Conditional access systems for digital video broadcast (DVB) transmissions are well known and widely used in conjunction with pay television services. Such systems provide secure transmission of a broadcast stream comprising one or more services to a digital receiver contained for example in a set-top box or a mobile terminal supporting broadcast services. To protect the broadcast services from unauthorized viewing, the data packets are scrambled (encrypted) at the transmitter side with a randomly generated encryption key commonly referred to as a control word. Further security may be provided by periodically changing the control words so they are only valid for a certain period (a so-called crypto period). In that case, for each crypto period the receiver side should be provided with a new control word. Typically these control words are transmitted in encrypted form to the receiver using so-called entitlement control messages (ECMs).

The distribution of periodically changing control words to authorized receivers may be implemented in various ways. The current DVB standards, such as the DVB SimulCrypt as described in ETSI TS 103.197 V1.4.1 of March 2007, describe an in-band control word distribution scheme wherein control words are distributed to the receiver by a head-end system which is configured to multiplex one or more streams of TV service data with associated streams of ECMs into an MPEG-2 transport stream and to transmit the transport stream to a receiver infrastructure.

In the receiver an ECM is filtered out of the transport stream and sent to a trusted computing environment, e.g. a smart card. The smart card subsequently decrypts the ECM using a higher-level key, which is common to all smart cards that are authorised to receive the TV channels associated with that key. The control word is returned to the receiver, which immediately loads the control word into the descrambler for descrambling data. Hence, the reception of an ECM by the receiver initiates an ECM processing cycle (i.e. the transmission of an ECM to the smart card, its decryption and the return of a control word CW to the receiver).

The ECM processing cycle, which relies on a one-to-one relationship between an ECM and a control word, limits the rate at which the receiver may be updated with control words.

When fast update cycles are required in order to increase security, the conventional ways of ECM processing within a receiver are therefore no longer suitable.

Moreover, some applications associated with multi-program transport streams require parallel and real-time descrambling of two or more services in one transport stream or in two or more different transport streams. In that case, for each crypto period new ECMs for each program stream should be processed by the smart card within a relatively short time frame. Given the limitations of the processing power, the I/O bandwidth and the storage capacity of a (single threaded) smart card, the throughput of ECMs required for descrambling multiple services may be affected thereby causing undesired service interruptions and/or errors.

US2008/0137850 describes a method for descrambling an MPEG-2 stream wherein multiple CWs associated with multiple PID channels (e.g. audio and video) are sent in a generic key packet to the CA receiver. This documents however does not describe a scheme for an efficient control word generation for scrambling multiple program streams and/or for use with multiple conditional access systems.

Hence, there is a need in the art for methods and systems allowing improved schemes for scrambling data and processing control words in a conditional access system.

SUMMARY OF THE INVENTION

Embodiments of the invention reduce or eliminate at least one of the drawbacks known in service provisioning systems. In a first aspect the invention relates to a method for generating a scrambled data stream wherein the method may comprise: providing a code book comprising code information for scrambling data in data stream comprising one or more service streams; generating a control word update message associated with at least one crypto period in at least one of said service streams; in response to said control word update message, generating on the basis of said code information at least one control word associated with said crypto period in said service stream; and, scrambling data associated with at least one of said service streams using said control word.

In various embodiments, the method uses code information in a code book to enable the head-end to efficiently generate control words for all or at a part of the service streams in the transport stream and/or for multiple crypto periods in one or more of these service streams. Such control word generation provides a significantly faster control word update mechanism when compared with conventional control word provisioning schemes. Further, the use of a code book decouples the relation between the ECM and the control word signalling as present in conventional conditional access system. Such decoupling prevents or at least reduces possibilities of unauthorized redistribution of control words. The use of a code book also reduces the overhead when providing more than one i.e. a plurality of control words to a receiver. This feature makes it attractive to start using different control words (keys) for different (cascaded) scramblers or other modules such as a watermark insertor.

In one embodiment, said method generates a scrambled data stream in a system comprising a synchronizer for provisioning a code book to one or more conditional access systems, the method comprising: sending a code book to a control word generator associated with at least one of said one or more conditional access systems, said code book comprising code information for generating one or more control words for scrambling data; said synchronizer sending a control word update message associated with at least one crypto period in at least one of said service streams to said control word generator; in response to said control word update message, said control word generator generating on the basis of said code information at least one control word associated with said at least one crypto period in said at least one service stream; and, scrambling data associated with at least one of said service streams using said control word.

In this embodiment, the CA systems are centrally provisioned with code books and, optionally, with CP schedules using a central synchronizer connected to a code book generator and a CP scheduler. Such code book generator and CP scheduler generates code books and CP schedule respectively for each CA system connected to the synchronizer. For efficient provisioning code books and/or CP schedules (or parts thereof) are shared between two or more CA systems. The CA Systems share a common set of generating functions for the appropriate processing code books and/or CP schedule information. In that case, the central synchroniser ensures that all CA systems involved, support the methods for processing code books and/or CP schedules.

In one embodiment, said control word update message comprises at least one reference to a crypto period and, optionally, a reference to a service stream, preferably said reference including at least one crypto period identifier and/or a service stream identifier. Hence, the provisioning of a control word update cycle is initiated by simply providing the control word generator in the secure module with a reference (i.e. pointer) in a control word update message.

In another embodiment, the method further comprises: sending said scrambled data and said code book, preferably in encrypted form, to one or more receivers. In yet another embodiment, the method comprises sending said control word request to one or more receivers. Hence, the code book is provisioned to the receivers for descrambling and using control word update message the head-end controls the initiation of a control word update cycle.

In one embodiment, the method further comprises: providing at least one crypto period schedule comprising scheduling information associated with crypto period transitions in at least one of said service streams; determining on the basis of timing information, preferably time stamps, in said scrambled data stream and said crypto period schedule a crypto period transition in a service stream; and, generating on the basis of said determined crypto period transition a control word update message. In another variant, said method further comprises: sending said crypto period schedule to one or more receivers.

In this implementation, the (part of the) time information on the crypto period transitions in the service streams is provided in a CP schedule. The crypto period controller uses the CP schedule and timing information associated with the scrambled data stream for generating a control word update message comprising a reference to a crypto period and, optionally, a service stream. The control word update message subsequently initiates the control word generator to provide the requested control word to the scrambler. The code book and the CP schedule fully determine the crypto periods and the associated control words in a multi-program transport stream. In combination with a CP schedule, the use of a code book allows fast and efficient control word update cycles for secure transmission of transport streams comprising multi-service streams with variable crypto period durations. Further, in this implementation, the head-end does not require to insert special trigger signals into the broadcast stream thereby reducing the signalling load to the receiver.

In one embodiment, the code book comprises code information for generating control words associated with each or at least a predetermined number of service streams in said data stream and/or for generating control words associated with subsequent crypto periods in at least one service stream.

In another embodiment, said code book comprises code information for generating a control word matrix, each control word entry in said control word matrix being associated with at least one service stream in said data stream and at least one crypto period in said service stream. In yet another embodiment, said code book comprises code entries for generating a control word matrix on the basis of a predetermined function, preferably a pseudo random number generation function.

The code book thus has different formats and contents and efficiently provides the control word generator in the head-end with information to generate multiple control words for scrambling data in the transport stream. The control matrix comprises all control words for all services in the transport stream. Further, a code book is associated with two or more different transport streams, each transmitted at a different frequency to the conditional access devices and each comprising a plurality of different service streams. Hence, the use of code books and, in some embodiments, the crypto period schedule provides efficient management of the control word provisioning in the head-end.

In one variant, said control word update message associated with at least one crypto period in at least one of said service streams is generated on the basis of said code book and a crypto period schedule. Said code book comprises code information for determining control words for each or for at least part of the service streams in said data stream and said crypto period schedule comprises timing information associated with crypto period transitions in each or at least part of said service streams.

In another variant, the duration of one or more crypto periods in at least one service stream varies in time, preferably randomly or according to a predetermined function. Dynamically controlling the crypto period duration in multi-service transport streams allows the head-end to control the processing load in the smart card.

In further aspects, the invention relates to a system for generating a scrambled data stream and a control word generator and a crypto period controller for use in such system.

In yet another aspect, the invention relates to data structures for enabling scrambling of data streams in a conditional access system. In particular, the invention relates to a crypto period data structure for use in a system for generating a scrambled data stream, wherein said crypto period data structure comprises schedule information associated with crypto period transitions in one or more service streams in said scrambled data stream and wherein—when stored in a memory of a crypto period controller—said schedule information allowing a processor in said crypto period controller to generate at least one entry in a crypto period matrix comprising crypto period time information associated with a predetermined number of subsequent crypto period transitions in each service stream of a multi-program transport stream. The invention also relates to a control word data structure for use in a system for generating a scrambled data stream, said data structure comprising code entries, wherein when stored in a memory of said control word generator, said code entries allowing a processor in said control word generator to generate at least one entry in a control word matrix comprising control words associated with a predetermined number of subsequent crypto periods in each service stream of a multi-program transport stream.

Various embodiments of the invention further relate to a computer program product, wherein the computer program product comprises software code portions configured for, when run on a computer, executing any of the method steps as described above.

Embodiments of the invention will be further illustrated with reference to the attached drawings, which schematically show embodiments according to the invention. It will be understood that the invention is not in any way restricted to these specific embodiments.

DETAILED DESCRIPTION

Figure 1:
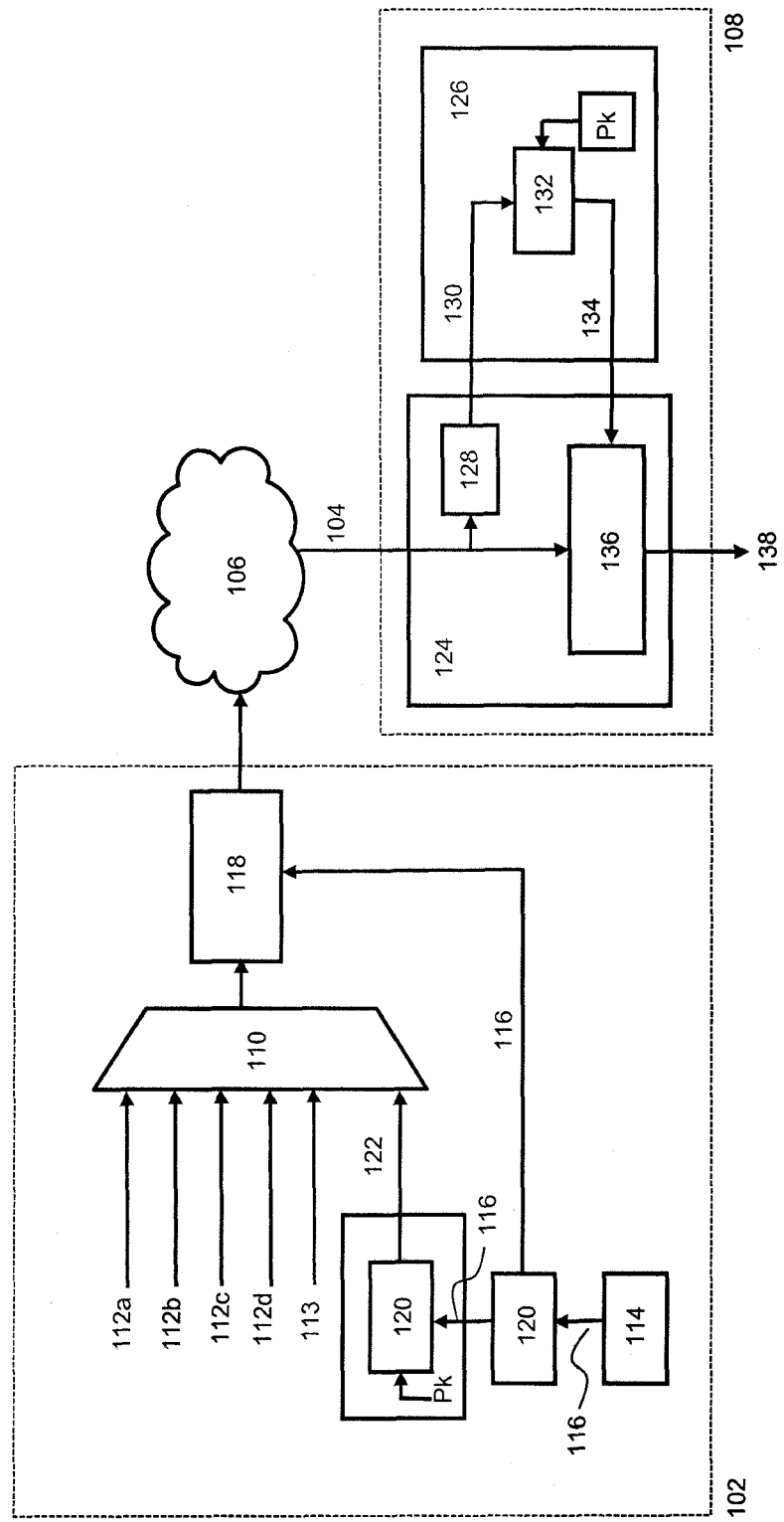
FIG. 1 depicts a schematic representation of a conventional conditional access system.

FIG. 1 depicts a schematic representation of a conventional conditional access system (CAS) 100. The system comprises a head-end system 102 for producing and sending a scrambled data stream 104, e.g. a transport stream or a multi-program transport stream, over one or more networks 106 to one or more conditional access devices 108, e.g. set-top boxes and/or a mobile conditional access terminals.

A multiplexer (MUX) 110 in the head-end multiplexes various input streams, e.g. the elementary streams of the one or more service streams 112a-112d comprising e.g. the TV programs, and produces a transport stream comprising a sequence of transport stream (TS) packets, each having a header and a payload wherein the payload comprises units of data from a particular elementary stream. Depending on the content and its format (e.g. HDTV) typically an MPEG-2 multi-service transport stream associated with one transmission frequency may comprise approximately ten television channels. A pay TV operator service package typically includes more than ten television channels so a number of separate MPEG-2 multi-service transport streams at different transmission frequencies are used to broadcast all television channels.

Further, metadata associated with the usage rights regarding the services in the transport stream may be provided by the head-end system in an entitlement management messages (EMM) 113 to the receiver. The EMM is further used to convey the secret key (i.e. the session key or product key) used by the receiver to decrypt ECMs A control word generator (CWG) 114 periodically generates control words (CW) 116, which are used by a scrambler 118 for scrambling the payload of the TS packets using a common scrambling algorithm such as the DVB-Common Scrambling Algorithm (DVB-CSA), the Data Encryption Standard (DES) and the Advanced Encryption Standard (AES). Each control word is only valid during a predetermined period of time (the so-called crypto period or CP). The receiver uses metadata (PAT, PMT) to know what service is carried in the payload. Information in the header of the TS packets, e.g. the PID values and scrambling (odd/even) status bits, may be used to select the appropriate control words for descrambling of the TS packet payload. Hence, in a conventional CAS system, the ECM-CW update cycle is reflected in the odd/even scrambling flags of the TS packet header.

In order to enable descrambling of the packets the broadcast stream needs to deliver the control words before they are used. In the broadcast head-end, the control words used for scrambling the TS packets are transmitted via a synchronizer 120 into an entitlement control message generator (ECMG) 122 and sent via the broadcast stream to the receivers. The ECMG encrypts the control words under a session key or a product key Pk and produces entitlement control messages (ECMs) carrying the control word in an encrypted form. The ECMs 124 are inserted into the transport stream and securely transmitted to the conditional access devices. The synchronizer (e.g. the SimulCrypt Synchroniser (SCS) in the DVB-SimulCrypt standard as described in ETSI TS 103197 v 1.4.1) synchronizes the ECM play-out relative to the crypto periods in the transport stream.

Although the head-end is typically employed to transmit transport stream (TS) packets in accordance with the MPEG-2 standards (International Standard ISO/IEC 13818-1) via a terrestrial, satellite or cable broadcast system, the methods and systems outlined herein may also be employed to provide scrambled content in Internet Protocol (IP) packets to a receiver using broadcasting, multicasting or point-to-point transmission techniques.

The conditional access device typically comprises at least one receiver 124 and one secure module 126, e.g. a smart card or the like. The receiver comprises a filter 128 for filtering EMMs and new ECMs out of the transport stream. A processor 132 in the smart card subsequently decrypts the filtered ECMs 130 using a product key stored in a secure memory of the smart card and returns the control words 134 to a descrambler 136 in the receiver which uses the control words for producing clear content 138. Conventional conditional access schemes (as provided for example in the DVB-SimulCrypt standard as described in ETSI TS 103197 v 1.4.1) thus use a new ECM for each new control word. Hence, each new ECM sent in the broadcast stream to the receiver initiates a control word update cycle, i.e. provisioning and activation of a control word to the descrambler of the receiver. This one-to-one relationship between an ECM and a control word in conventional condition access systems practically limits control word update cycles times within a range between 5 and 10 seconds. Moreover, it also introduces a problem for transcontrol at the boundaries of a media distribution system. Decryption of large amounts of ECMs is required in order to generate new ones for use in a further media distribution system.

Figure 2:
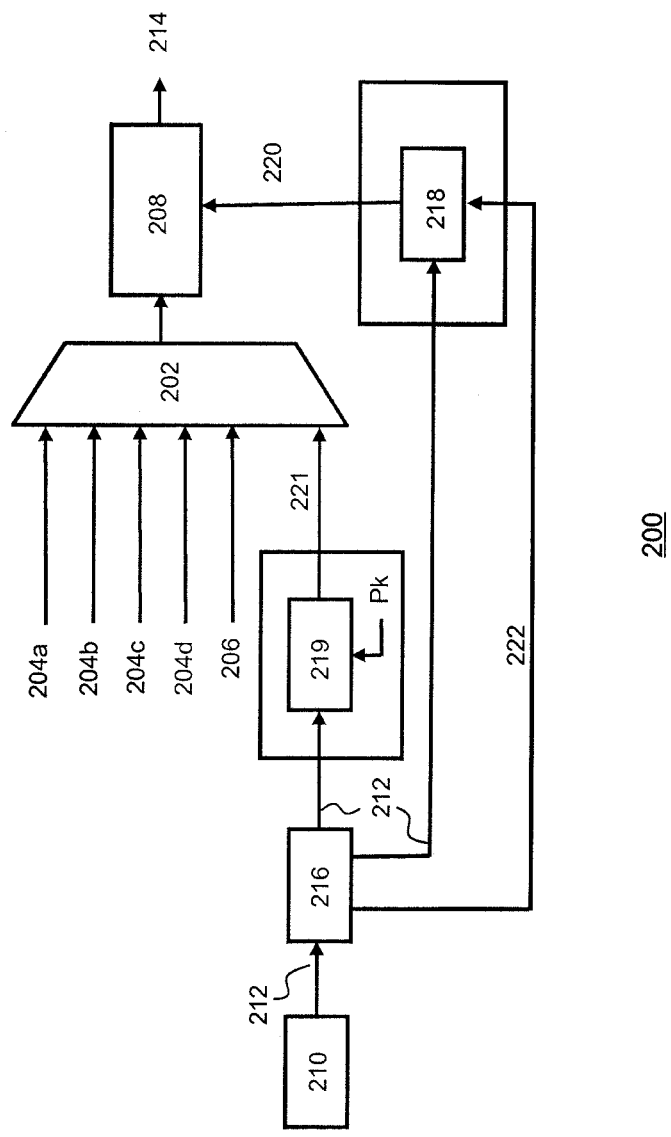
FIG. 2 depicts a schematic representation of a conditional access system using a control word update mechanism according to one embodiment of the invention.

Fast control word updates cycles may be desired for enhancing security, improving switching times between programs in a multi-program transport stream and/or for descrambling multiple programs in a multi-program transport stream in parallel. Further, it would be desirable to have a control word update scheme which allows efficient control word management. FIG. 2 depicts a schematic representation of a head-end 200 using an improved control word update mechanism according to one embodiment of the invention. The head-end comprises multiplexer 202 for multiplexing one or more service steams 204a-204b and EMMs 206 into a transport stream comprising TS packets, which are subsequently fed into a scrambler 208. Further, the head-end may comprise a code book generator 210 for generating a code book 212 comprising code information, e.g. code entries, associated with control words in the service streams of the transport stream 214 generated by the head-end. A generated code book is sent to a synchronizer 216 which manages the control word update cycle in the head-end. The synchronizer may forward the code book to a control word generator (CWG) 218, which uses the code information in the code book for generating control words 220 associated with a predetermined number of services and/or crypto periods in the transport stream.

The control word update cycle is started with the synchronizer transmitting a control word update message 222 comprising a crypto period identifier (CP_ID) and a service stream identifier (Service_ID) to the CWG. Based on the code information in the code book and the identifiers in the service stream request, the CWG may generate control words for all or at least a plurality of services in the broadcast stream and/or for multiple crypto periods in the service streams.

In one embodiment, the code book may comprise (or may allow the generation of) an array of control words for a single service. In such an array of control words, the CP_ID in the control word message may be used to select the appropriate control word in the array. In another embodiment, the code book may comprise (or may allow the generation of) a array of control words assigned to a certain crypto period, wherein each control word is associated with a service in the transport stream. In that case, the service identifier (Service_ID) in the control word update message may be used to locate the appropriate control word in the array of control words. In a yet another embodiment, the code book may allow the generation of a control word matrix, wherein control word entries in the matrix may be selected using the Service_ID and the CP_ID as indices of the matrix. If the control matrix comprises all control words for all services in the transport stream, very fast zapping between services within one multi-program stream (i.e. intra-transport stream switching) may be achieved as no tuning action is required and all control words of all services in one transport stream are available through the code book.

In order to provide the conditional access devices with the code book, it may be sent to the input of an entitlement control message generator (ECMG) 219 for encrypting the code book under an appropriate product key Pk. This special code book ECM 221 may be inserted into the transport stream and transmitted to the receiver.

Figure 3:
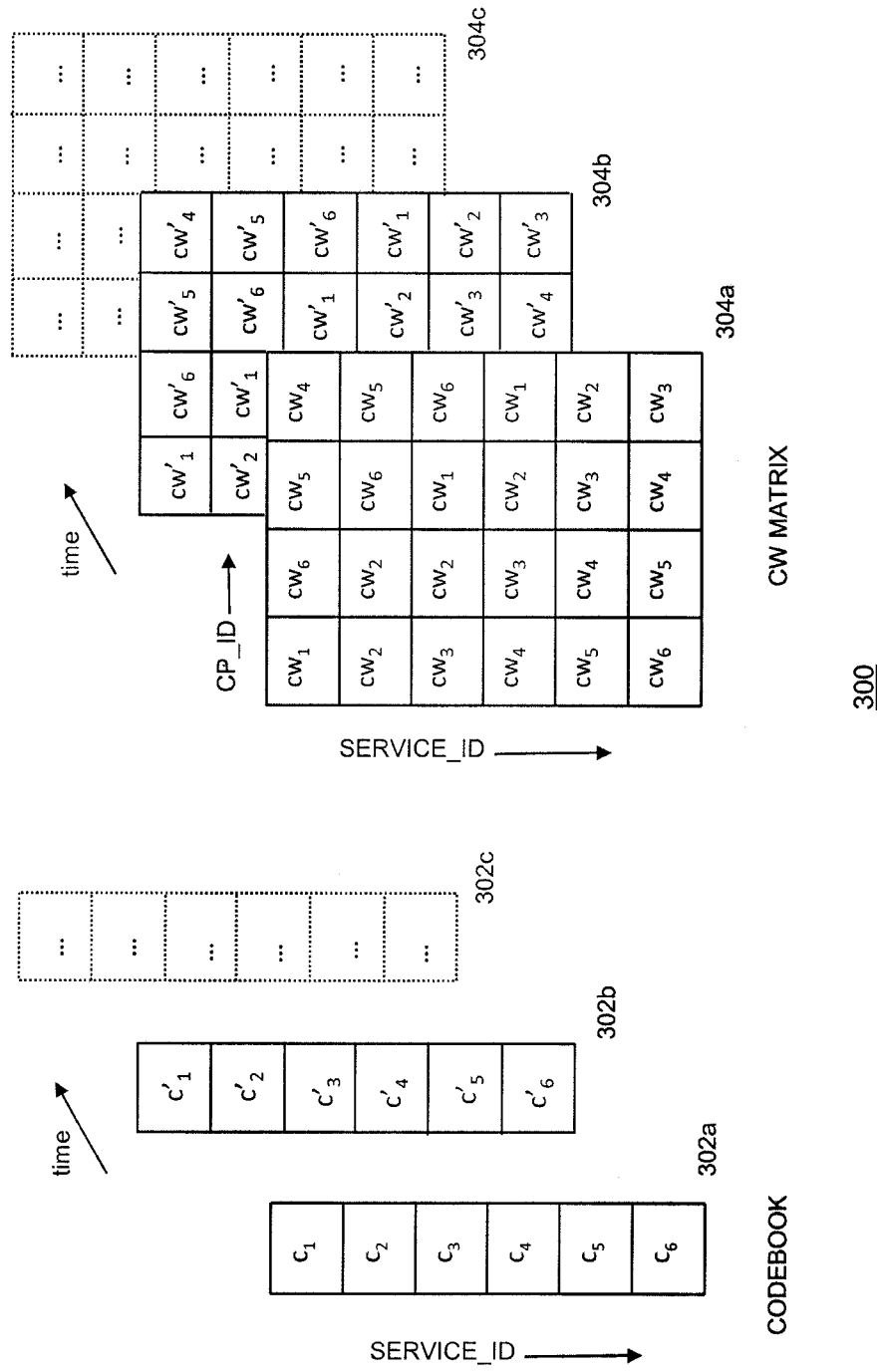
FIG. 3 illustrates one embodiment for constructing of a control word matrix on the basis of a code book.

As the code book may contain a relatively large number of code entries, the size of the code book ECM and the ECM data rate may increase rapidly. The size of the code book may be reduced by generating the matrix according to a specific function instead of transporting the matrix as a whole. FIG. 3 illustrates an exemplary way of the CWG generating a control word matrix on the basis of a code book. The code book 302a may comprise a predetermined number code entries c1-c6 associated with the first crypto period CP1 of a number of service streams identified by their Service_ID. The code entries may be control words or parameters (seeds) for producing a control word.

In FIG. 3 an exemplary way of generation a control word matrix 304 is illustrated wherein six code entries c1-c6 in the code book are used by the control word generator to generate six control words cw1-cw6 forming the first column of the control word matrix associated with a first crypto period CP1. The subsequent columns of the matrix associated with subsequent crypto periods CP2, CP3 and CP4 are formed by permutations of the control words in the first column This way the six code entries in the code book allow the control word generator to generating a 6×4 control word matrix. It is clear for those skilled in the art that the process illustrated in FIG. 3 may be generalized to a scheme wherein a code book with k code entries may be used to generate a m×n control word matrix, wherein k≦m, n or k<m×n. Hence the size of the code book may be significantly smaller when compared with the associated full control word matrix, reducing the signaling load to the conditional access devices.

The control word matrix is only valid for a number of subsequent crypto periods. Once the validity of the matrix is expired (for example the control word matrix 304a in FIG. 3 is valid for four predetermined CP periods), a code book refresh cycle is required in order to provide the system with a new code book 302b which allows the generation of an associated control word matrix 304b. This process may be repeated for generating subsequent control matrices 304a-304c in time.

An even more compact code book may use a control word generating function f to generate a control word matrix or entries therein. The input parameters for such a control word generator function may be a code entry (a seed) in the code book in combination with the matrix row index and the matrix column index. An example of such function is the Pseudo Random Number Generator (PRNG) function.

This well known class of functions may use a code entry from the code book, the matrix column index (CP_ID) and the matrix row index (Service_ID) as its input variables in order to produce an entry $cw(c)_{k,l}$ in the control word matrix wherein: $cw(c)_{k,l}$=PRNG (c, k, l) wherein c represents a code entry in the code book, matrix index k represents a Service_ID of a service in the transport stream and matrix index l represents a crypto period identifier CP_ID of a crypto period in the service stream Service_ID. Hence, such function and a code book comprising six code entries (e.g. similar to the one depicted in FIG. 3) allows the generation of six subsequent control word matrices $cw(c_i)_{k,l}$ (i=1-6). The PRNG may be based on simple binary operations thus allowing very fast calculation of a control word so that not all matrix entries need to be generated in advance. A control word may be calculated when it is requested.

In one embodiment, the CAS system may use a set of control word generating functions, which are both present in the head-end and in the secure module of the conditional access device. In that case, the synchronizer may select a control word generating function for producing control words on the basis of the code book information and may signal the selection of the control word generating function to the secure module by using a control word function identifier thereby enabling the conditional access device, in particular the control word generator (CWG) in the secure module, to select the correct control word generating function. Transmission of the control word function identifier may be combined with the transmission of the code book information to the receiver using e.g. a code book ECM.

It is submitted that the form, the content and the use of the code book are not limited to the examples as described with reference to FIGS. 2 and 3. In further variants, a code book may be associated with two or more different transport streams, each transmitted at a different frequency to the conditional access devices and each comprising a plurality of different service streams. The use of such code book by a conditional access device allows fast zapping between the different service streams in the different transport streams. In that case, the zapping time will be limited by the tuning action in the receiver of the conditional access device.

A conventional transport stream typically comprises six to ten ECM streams for enabling a conditional access device to descramble the services in a transport stream. As a code book provides all information for descrambling the services in a transport stream and as a code book ECM may be of the same size as a conventional ECM, signaling control words using a code book ECM may allow a significant reduction in bandwidth load.

Figure 4:
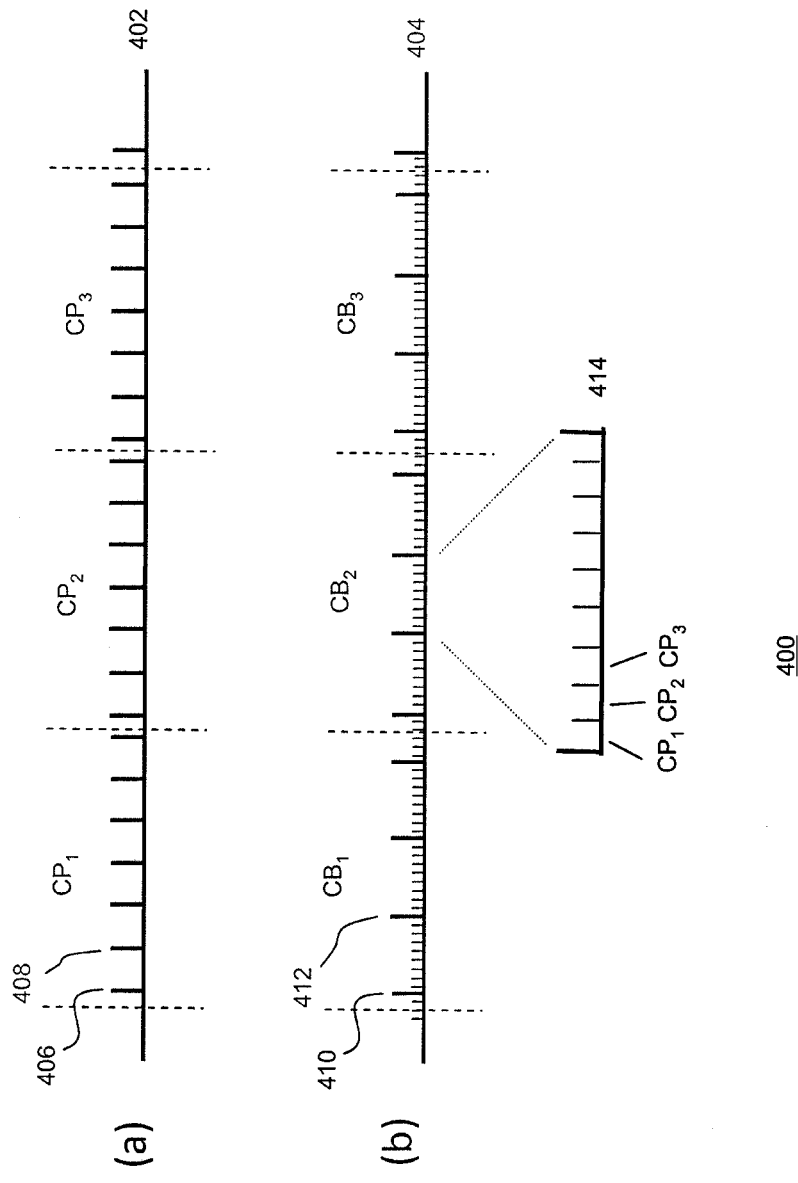
FIG. 4 depicts a schematic representation of a head-end wherein the crypto period signaling based on monitoring timing information.

FIG. 4 schematically depicts the control word update cycles 400 using (a) a conventional conditional access scheme and using (b) a control word update scheme according to the invention. In the conventional scheme typically a service stream 402 comprises crypto periods (CP1, CP2, CP2) of a duration between 5-10 sec. Within a crypto period, identical ECMs 406,408 (e.g. every 0.5-1 sec.) are sent to the receiver so that the zapping time for switching from one service to another service remains within an acceptable range.

In the scheme according to the invention, the service stream 404 may be divided in a number of code book periods (CB1, CB2, CB3) wherein each code book period may be associated with a different or at least a partly different code book. Hence, within each code book period at least one code book is sent to the receiver. The duration of the code book period depends on the size of the generated code book and/or the selected control word generating function and may have a duration between 5-10 second. Similar to the conventional scheme, during one code book period multiple repeat code book ECMs 410, 412 may be sent to the receiver in order to provide acceptable zapping times between services in different transport streams. If however the code book is associated with two or more different transport streams, it allows the generation of control words for services in different transport streams. In that case, a conditional access device in principle only requires reception of one code book per code book refresh cycle.

Further, as the control words are provisioned on the basis of a code book and a control word generating function (instead of using the conventional ECM refresh cycle), the duration of the crypto period may be selected within a range between 0.01 and 1 second thereby significantly improving the key cycling rate which enhances the security of the transport streams. This is schematically illustrated by inset 414 depicting short crypto periods and control word cycles.

The use of a code book requires a means to signal the receiver which control word needs to be generated for use in the descrambler. For that reason, a control word generating function in the smart card may require at least a crypto period identifier and a service identifier and, in some embodiments a seed, in order to select or generate a control word on the basis of the code book. In some embodiments, the smart card may comprise a plurality of pre-configured control word generating function. In that case, head-end may signal the smart card which function should be used. The signaling of this function may be through the use of a function identifier which may be sent with the code book in an ECM to the smart.

Typically the service stream identifiers associated with the services in the transport streams are already signaled in metadata sent to the receiver. However, existing head-end systems do not provide signaling of crypto period identifiers for identifying a crypto period in a service stream because in conventional CAS systems the activation of a control word in the head-end is determined by the play-out of an ECM.

In one embodiment, the crypto period may be signaled by including the CP_ID in the metadata. For example, the identifier may be included as clear text in an ECM message. Detection of such CP_ID by the receiver may trigger the receiver to generate a control word request comprising the CP_ID and to send this request to the smart card. In another embodiment, the crypto period may be identified using timing information, e.g. timestamps in the broadcast stream such as the Program Clock Reference (PCR) in a MPEG-2 transport stream. The timestamp values may be mapped to a crypto period using a pre-determined function so that the signaling of the crypto period may be realized by tracking the timestamps.

Figure 5:
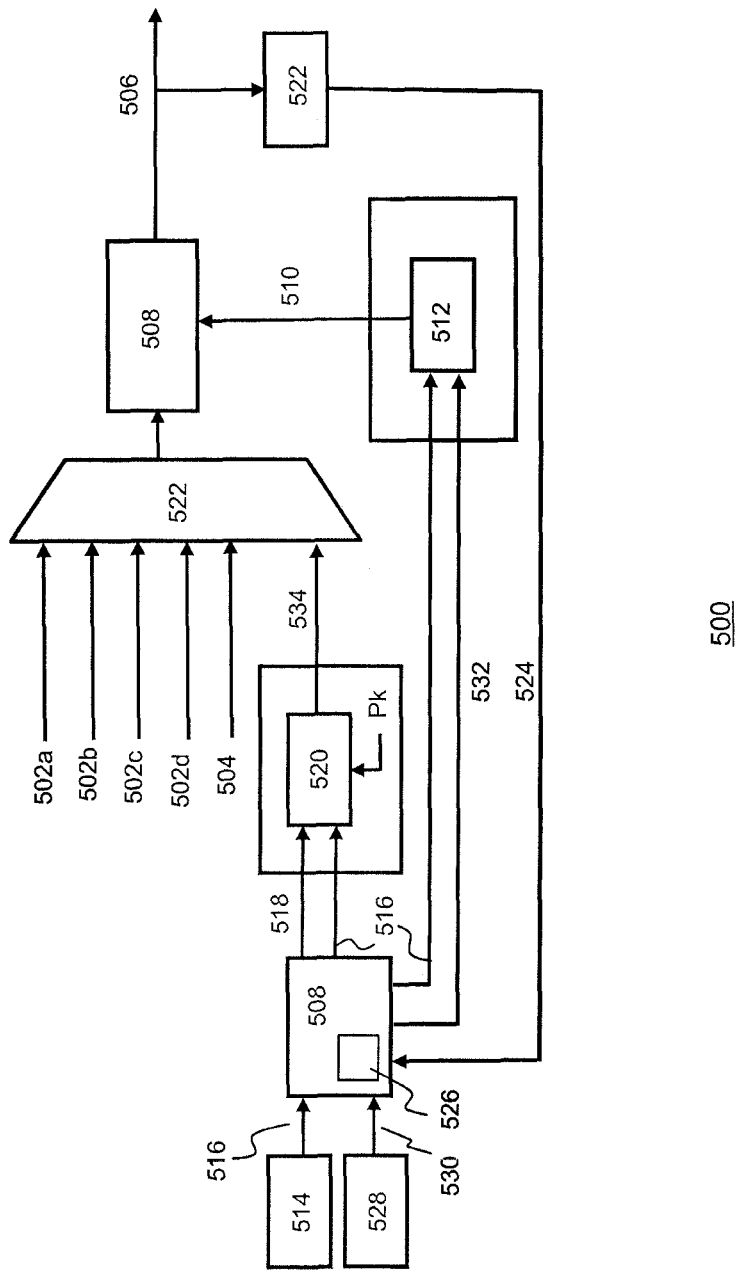
FIG. 5 depicts a schematic of schematic representation of a head-end wherein the crypto period signaling is managed by monitoring timing information.

FIG. 5 depicts a schematic representation 500 of a head-end wherein the crypto period signaling is managed by monitoring timing information in the transport stream. The head-end in FIG. 5 comprises a multiplex for multiplexing service streams 502a-502d and EMMs 504 into a multi-service transport stream 506. The TS packets in the transport stream are scrambled by scrambler 508. The scrambler receives control words 510 from a control word generator (CWG) 512. The CWG generates control words on the basis of a code book as described with reference to FIG. 3. A code book generator 514 generates code books 516 and transmits these code books to a synchronizer 518 which forwards the code books to the control word generator and to an ECM generator (ECMG) 520 so that the code book may be provided as an ECM in the transport stream to the conditional access devices.

In this scheme, a time-base filter 522 may filter timing information, e.g. time stamps, out of the transport stream and feeds the timing information using periodic Time Update messages 524 to a crypto period controller (CPC) 526, which may be co-located with the synchronizer. The CPC may receive a crypto period (CP) schedule 528 from a crypto period scheduler (CPS) 530. On the basis of timing information in the CP schedule and the Time Update messages, the CPC may determine at what time a crypto period transition in a particular service stream should occur and may issue at appropriate points in time control word update messages 532 to the CWG so that control words may be provided in time to the scrambler in order to scramble data in the transport stream in accordance with the timing information in the CP schedule. The synchronizer 518 may send the CP schedule to the ECM generator 520 so that the CP schedule may be transmitted in an ECM 534 to the receivers, which require the CP schedule for determining the crypto periods in the service streams and transitions therein. The CP schedule may be sent to the conditional access device in clear text or in encrypted form. In the latter case, the CP schedule should be decrypted by the smart card before it can be used by the receiver.

In one embodiment, all service streams may have the same (static) crypto period duration and all crypto periods in the service streams are aligned. In that case the time information in the CP schedule may simply comprise the crypto period duration and the starting time of a first crypto period. On the basis of these parameters and the monitored transport stream time T, each crypto period (transition) in the transport stream may be determined.

In another embodiment, the head-end may be configured to use a scheme wherein the duration of the crypto periods within one service stream and/or between two or more service streams is(are) variable. For example, the head-end may be configured to vary the duration of the crypto period in a service stream randomly between a minimum and maximum duration or according to a pre-determined (periodic) function. As the use of a code book significantly reduces the ECM processing, the use of variable crypto periods does not have an effect on the processing load of the smart card. Head-end implementations which are capable of dynamically changing the duration of the crypto period in a transport stream are described in related European patent application no. 09155287.7, which is hereby incorporated by reference into this application.

Figure 6:
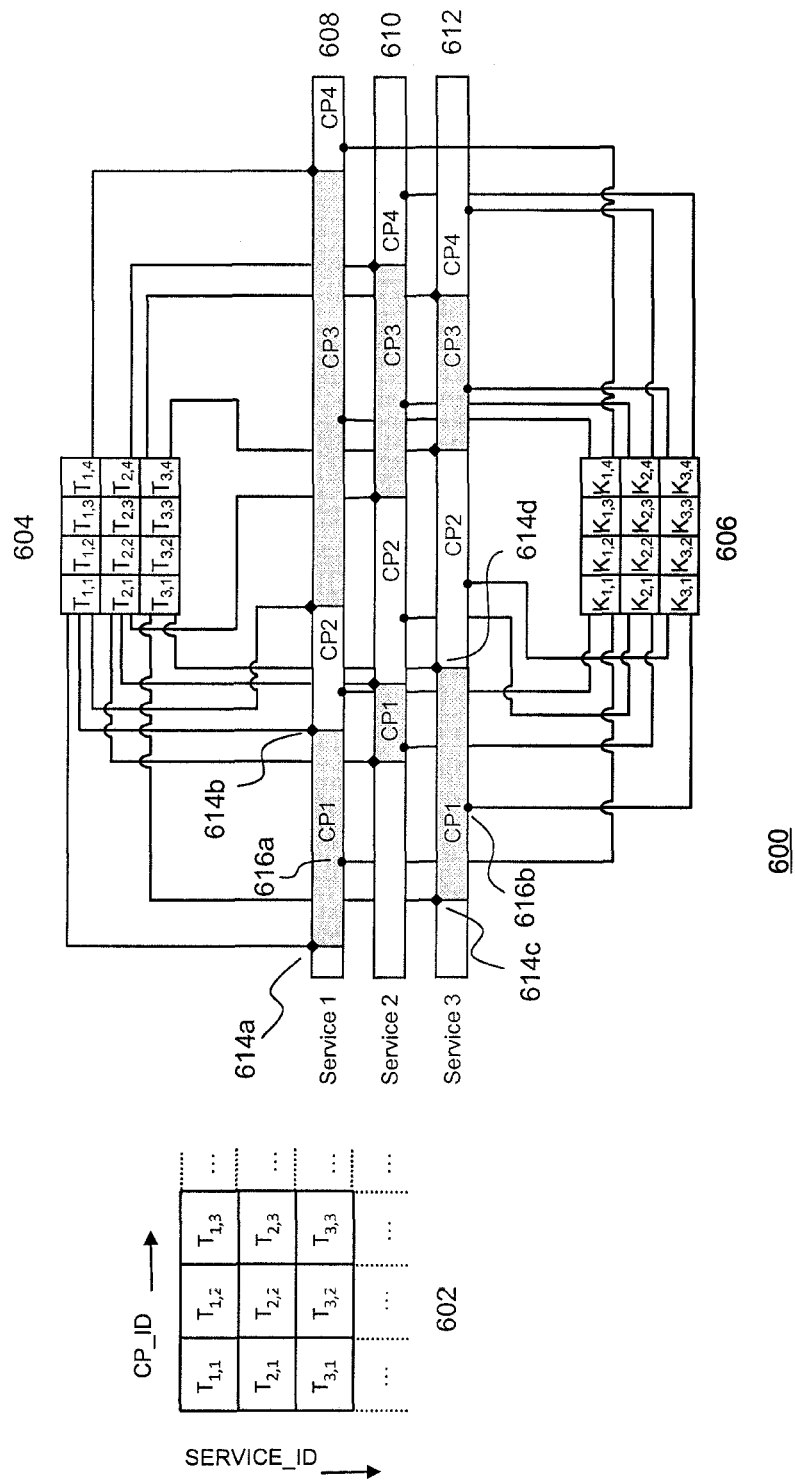
FIG. 6 illustrates the use of a CP schedule and a control word matrix.

In the case of a variable crypto period duration, the CP schedule may comprise timing information about the subsequent crypto period transitions in each of the service streams. In that case, the timing information in the CP schedule may be generally represented as a matrix 604 as depicted in FIG. 6. Such a CP schedule matrix may comprise for each service stream (Service_ID) subsequent points in time ($T_{1,1}$; $T_{1,2}$; $T_{1,3}$; ... ) at which a new crypto period starts. The use of the CP schedule matrix in combination with the control word matrix is schematically illustrated in FIG. 6 depicting three service streams 608, 610, 612 as a function of time. In this embodiment, the duration of the crypto periods is not constant but varies in time. The variation may be selected in such a way that transitions in different service streams are spread in time and that multiple simultaneous transitions in different service streams are avoided. This way the signaling in the transport stream and the control word processing in receiver and secure device may be controlled. Moreover, variation of the duration in the crypto periods may increase the security. The FIG. 6 illustrates that the scrambled services streams are fully defined by the CP schedule matrix 604 and the associated control word matrix 606.

For example, the first service stream 608 comprises a first crypto period CP1 starting at $T_{1,1}$ 614a and ending at $T_{1,2}$ 614b for which $K_{1,1}$ 616a is the valid control word entry in the control word matrix 612. Similarly, the third service stream 612 comprises a first crypto period starting at $T_{3,1}$ 614c and ends at $T_{3,2}$ 614d for which $K_{3,1}$ 616b is the valid control word entry in the control word matrix 612. Hence, a multi-service transport stream comprising crypto periods of variable duration may be fully defined by a control word matrix and an associated CP schedule matrix.

Similar to the use of a code book for generating an control word matrix, the CP schedule matrix may be generated on the basis of a CP schedule. Such schedule may comprise CP entries for use in a CP generating function, which may be located in the CPC associated with the synchronizer in the head-end. On the basis of the CP schedule and by monitoring the time T in the transport stream, the receiver may determine the occurrence of a crypto period transition.

Hence, in one embodiment the CAS system may use a set of CP generating functions, which are both present in the head-end and the conditional access device. In that case, the CPC associated with the synchronizer in the head-end may comprise a set of CP generating functions and may select a CP generating function for producing (part of) a CP schedule matrix on the basis of the CP schedule. The head-end may signal the selection of the particular CP generating function by sending a CP function identifier associated with the selected CP generating function to the conditional access device thereby enabling the CPC in the receiver or in the smart card to select the correct CP generating function. The transmission of such CP function identifier may be combined with the transmission of the CP schedule to the receiver using e.g. a CP schedule ECM.

The CP schedule matrix may only be valid for a predetermined number of crypto periods, e.g. when the crypto periods vary in time. In that case—similar to the control word matrix—also the CP schedule matrix needs to be updated. Alternatively, in case of a fixed or periodic crypto period duration, the same CP schedule matrix may be active and unchanged over a very long time or cover a large number of crypto periods. The CP schedule may be transmitted in encrypted form or in clear text depending on the receiver implementation. If the CP schedule does not change frequently, it may be included with the normal TV channel parameter signaling methods such as PMT in MPEG-2 streams.

In one embodiment, a simple linear transformation on the basis of the transport stream time base, the crypto period duration and the initial time of a CP sequence may be used to calculate a crypto period transition and a crypto period identifier. For example, in order for a receiver to detect the first crypto period transition in the first service stream 608 as depicted in FIG. 6, the time T is obtained by monitoring filtered time stamps from the transport stream using a time-base filter and by comparing it to the time for the initial crypto period. The timing information is signaled by the time-base filter through Time Update messages to a crypto period controller (CPC) in the receiver or in the smart card. On the basis of the CP schedule, the CPC may subsequently determine that a transition should take place when the value T increases beyond a time value $T_{i,j}$ in the CP schedule matrix. At that moment, the CPC may trigger the generation of control word request comprising a CP_ID associated with the identified transition as provided in the CP schedule. In order to obtain the required accuracy in timing, the clocks in the head-end and the receiver may be synchronized using well known synchronization techniques. As will be described in more detail hereunder with reference to FIGS. 7 and 8, activation of control words in the descrambler by the generation of a control word request may also be achieved through other means, e.g. by using the scrambling control fields in the TS packet header.

The control word update mechanisms as described with reference to FIG. 2-6 replace the conventional ECM update cycle with a fast control word generating function. The function may generate control words using selection or transformation of code information in a code book. Based on the code information, control words may be generated for all service streams in the transport stream and/or for multiple crypto periods in these service streams. The control word generation provides a significantly faster control word update mechanism when compared with conventional control word provisioning using ECM decryption.

The use of a code book decouples the relationship between the ECM and the control word as present in conventional conditional access systems. Such decoupling improves security as the receiver has less control over the smart card operation. In combination with a CP schedule, the use of a code book allows fast and efficient control word update cycles for secure transmission of transport streams comprising multi-service streams with variable crypto period durations.

Furthermore, the use of a code book reduces the overhead when using large amounts of control words. This feature makes it attractive to start using different control words (keys) for different (cascaded) scramblers. For example, the commonly used DVB scrambler currently shares the control words in two sequential (de)scrambling stages. The use of a code book enables such super scrambling operation to use two different control words. Further, the use of a code book may also be used to control other stream processing modules in the head-end, for example, a watermark inserter.

Figure 7:
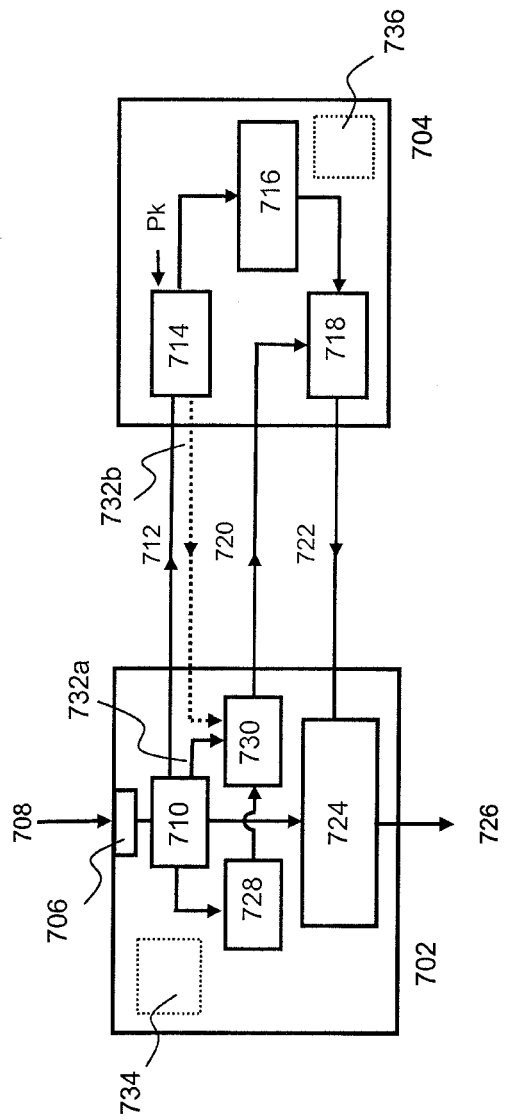
FIG. 7 depicts a schematic of a conditional access device according to one embodiment of the invention.

FIG. 7 depicts a schematic of a conditional access device according to one embodiment of the invention. The conditional access device is configured to receive code books, and in some embodiments, CP schedules and to process the information therein. The conditional access device comprises a receiver 702 and a secure module 704, e.g. a removable smart card or a tamper-resistant module providing a secure and trusted environment for processing the code book and the control words. The receiver comprises a tuner/demodulator 706 for receiving the transport stream 708 via a network interface and a demultiplexer (DEMUX) 710 for filtering the TS packets belonging to one or more TV services as selected by the user by means of a user interface.

Further, the demultiplexer may extract ECMs 712 comprising a code book and/or a CP schedule from the transport steam. The code book ECM is sent to a decryptor 714 in the secure module which decrypts the ECM on the basis of a product key Pk stored in a secure memory of the secure module. The code book, including its code information is subsequently stored in a code book table 716. In some embodiments, the code book ECM may also comprise a control word function identifier for signaling the control word generator which control word generating function may be used with the code book. The control word function identifier may also be stored in the code book table.

Once the code book is stored, the code information and, in some embodiments, the control word function identifier, may be used as an input parameter for a control word generator (CWG) 718. A control word refresh cycle in the conditional access device may be initiated by the CWG receiving a control word request 720 from the receiver. In one embodiment, the control word request may comprise a service stream identifier (Service_ID) and a crypto period identifier (CP_ID) for identifying the crypto period for which the control word is to be used.

Before triggering the CWG, the secure module may check whether the receiver is authorized to receive the requested control word (not shown). To that end, the secure module may be provided with metadata associated with usage rights regarding the services in the transport stream, which are provided by the head-end system in an entitlement management messages (EMM) to the receiver.

If it is established that the receiver is authorized to receive the requested control word, it may use the CP_ID and Service_ID and the code information from the code book to generate a control word. For example, in the case of a code book as discussed with reference to FIG. 3, the control word generator may construct (part of) a control word matrix using the code entries in the code book and select the appropriate entry in the control word matrix. The corresponding matrix entry is then returned as the requested control word 722 to the descrambler 724 receiver in order to produce a clear service stream 726.

In the conditional access device as depicted in FIG. 7, the control word request is generated by a crypto period controller (CPC) 730 located in the receiver, which sends the generated control word request 720 to the CWG 718 in the secure module. The CPC may be initiated by a trigger signal comprising a reference to a crypto period, e.g. a CP_ID.

A trigger signal may be generated by the head-end using e.g. clear text in an ECM or in the form of a separate CW trigger message. The demultiplexer may filter the trigger signals from the transport stream and subsequently send these messages to the CPC. In a variant, a trigger signal may be an out-of-band signal provided by the head-end via a separate communication channel to the receiver (not shown). Information for establishing the out-of-band connection, e.g. the IP address and port information, may be sent to the user using an EMM message.

The processes in the receiver and the smart cart associated with the control word update cycle may be controlled by a receiver controller 734 and a smart card controller 736 respectively, each comprising one or more processors and one or more memory modules (e.g. RAM, ROM and/or cache memory) for storing and executing portions of software code and a clock for synchronizing the processes with a time-base.

The head-end may not necessarily send a trigger signal for each crypto period transition. In one embodiment, a first trigger signal comprising a crypto period reference is sent to the receiver and initiates the CPC to generate and transmit a control word request to the CWG in the secure module. In response, the CWG generates a control word associated with a crypto period in a service stream as indicated in the request. Thereafter, a predetermined number of subsequent crypto period transitions may be detected by the receiver. Detection of crypto period transitions may be achieved by monitoring the change of the scrambling control field or an error signal originating from the decoder.

The header of the TS packets comprises scrambling state information in the form of a transport scrambling control field. The subsequent crypto periods in a service stream may be regarded as alternating odd and even crypto periods, wherein TS packets scrambled during odd crypto period carry the value "11" in the transport scrambling control field and TS packets scrambled during an even crypto period carry the value "10" in the transport scrambling control field. Hence, the transition between these values in the transport control field identifies a transition from one crypto period to the next. The detection of such transition may be used by the CPC in the receiver to generate a new CW request, instructing the CWG in the smart card to provide a control word from the control word matrix associated with a subsequent crypto period index. The generation of control word request on the basis of the scrambling state information allows further reduction of the signaling load to the receiver. After a predetermined number of detected transitions, a second further ECM comprising a further crypto period reference is sent to the receiver so that the process may be repeated on the basis of the information in the second ECM.

In yet another embodiment, a trigger signal comprising a CP_ID and a repetition value is sent the CPC in the receiver thereby initiating the transmission of a control word request to the control word generator in the secure module. The repetition value may activate a repetition mechanism in the CPC wherein the CPC may generate control word requests at predetermined time intervals on the basis of the repetition value and wherein for each subsequent request the next entry in the row of the control word matrix is used. After a predetermined number of repetitions, a further ECM is sent to the receiver in order to assure that random access to entries in the control word matrix is assured.

In another embodiment, the trigger signal for the receiver to issue a control word request may be determined on the basis of monitored timing information, i.e. time stamps, in the transport stream (e.g. the PCR in an MPEG-2 transport stream) and knowledge of the crypto period transitions in the transport stream as for example provided in a CP schedule matrix.

To that end, the head-end may send timing information about the crypto period transitions in the transport stream to the receiver. In one embodiment, the receiver may receive a CP schedule from the head-end. Such CP schedules are described in detail with reference to FIG. 6. The head-end may send the CP schedule in the broadcast stream to the receiver or via a separate out-of-band communication channel (not shown). The CP schedule may be sent as clear text or in encrypted form in an ECM to the receiver. The ECM filter may extract the ECM from the broadcast stream and provide—in the case of clear text—the CP schedule directly to the CPC (step 732a). Alternatively, if the CP schedule is encrypted, the ECM is sent to the decryptor 714 in the smart card, which subsequently returns (step 732b dotted line) the decrypted CP schedule to the CPC 730 in the receiver.

Using a CP generating function, the CPC may generate on the basis of the CP schedule (part of) a CP schedule matrix.

When the CAS system uses a set of CP generating functions, selection from the set of CP generating functions comprised in the CPC may be signaled by the head-end using a CP function identifier. In one embodiment, the head-end may use a CP schedule ECM comprising at least one CP schedule and at least one CP function identifier.

On the basis of the monitored time T and the timing information in the CP schedule matrix, the CPC in the receiver may identify a crypto period transition and generate a control word request 720 comprising a CP_ID associated with the identified transition.

Such scheme provides the advantage that the head-end does not have to insert special trigger signals into the broadcast stream thereby reducing the signaling load to the receiver. Time stamps may be monitored using a time base filter 728, which subsequently sends the timing information in Time Update messages to the CPC. On the basis of the monitored timing information and the CP schedule, the CPC may control at which time a new control word update cycle should be initiated by sending a control word request to the CWG in the secure module. A CP schedule also may be provided to the CPC in advance using methods as described with reference to FIG. 5.

Figure 8:
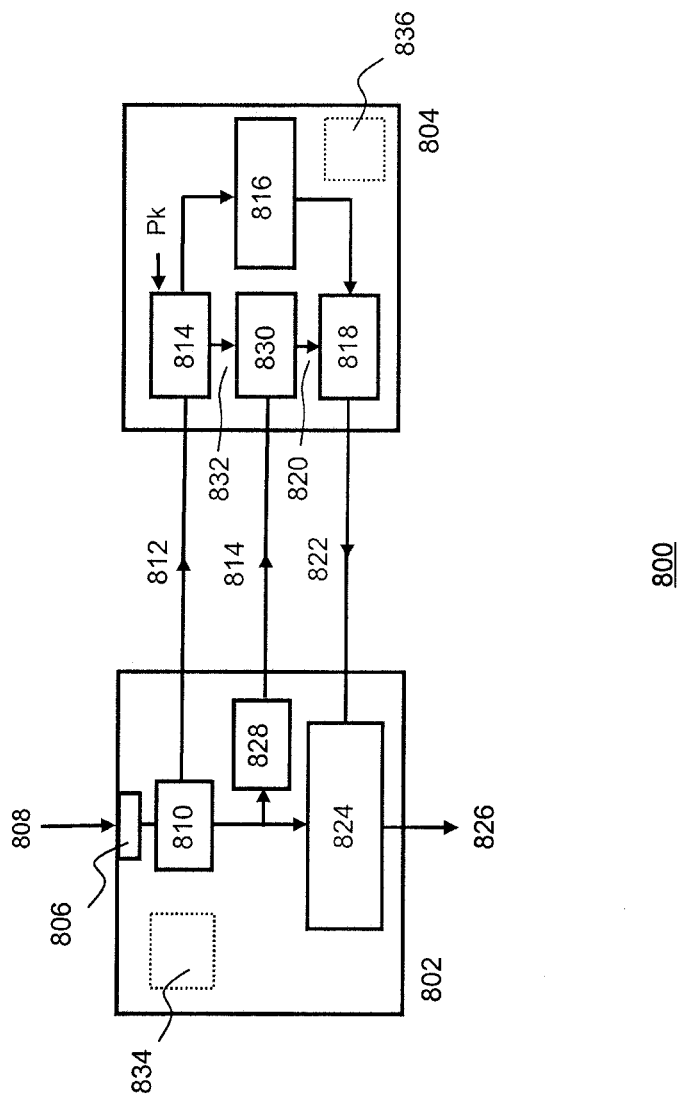
FIG. 8 depicts a schematic of a conditional access device according to another embodiment of the invention.

FIG. 8 depicts another variant of a conditional access device according to the invention. The general layout of the elements in receiver 802 and the secure module 804 are similar to those in FIG. 7, however in this variant, the CPC 830 is located in the secure module. The secure module is therefore provided in advance with at least one code book and at least one associated CP schedule and, optionally, one or more control word function identifiers and/or CP function identifiers. For example, both the code book and the CP schedule may be provided to the secure module via one or more ECMs. In that case, the decryptor 814 decrypts the ECM and forwards the code book (and optionally a control word identifier) to the code book table 816 and transmits (in step 832) the CP schedule (and optionally the CP function identifier) to the CPC 830. It is noted however that other implementations for provisioning the CP schedule and associated information such as function identifiers to the secure module may also be possible, e.g. in one variant, the CP schedule is not encrypted and provided as clear text in an ECM or another message to the secure module.

During the descrambling process in the receiver, the CPC is provisioned with timing information using Time Update messages 814, which are sent by a time-base filter 828 to the secure module. The CPC subsequently determines on the basis of the monitored timing information and (part of) the CP schedule matrix at what time a crypto period transition occurs. At that time, the CPC sends a control word request message 820 to the CWG 818 so that a control word may be derived from the code book and transmitted in time to the descrambler in the receiver. This implementation provides the advantage that no apparent relation exists between the control word signaling from the secure module to the receiver and the timing signaling to the secure module thereby providing further enhanced security.

The control word request message generated by the CPC may not necessarily always comprise a CP_ID and a Service_ID. In one embodiment, the control word request message only comprises a service stream identifier. Upon occurrence of a predetermined change in the state of the receiver, e.g. when the user switches a channel, the new Service_ID is signaled to the CWG. In the steady state, a secure module uses the service stream identifier which is currently activated (e.g. the service stream that the receiver is currently descrambling) and only at event boundaries, e.g. when the user switches a channel, a new Service_ID is sent to the CPC.

Figure 9:
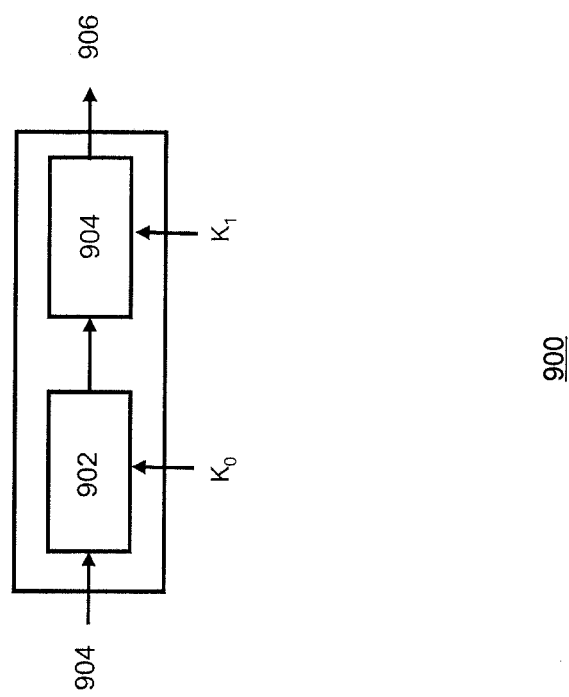
FIG. 9 depicts a schematic of two cascaded (de)scrambling blocks.

Other advantageous uses of the invention may be illustrated on the basis of the system in FIG. 9, which schematically depicts two cascaded (de)scrambling blocks 902, 904 using a first and second key respectively. Such (de)scrambling system may for example relate to the DVB common scrambling algorithm (DVB-CSA) comprising a stream cipher and block cipher. Conventional head-ends using the ECM update cycle for providing control words to conditional access devices are not suitable for providing two different keys simultaneously to the ciphers so that in a conventional system usage the two sequential (de)scrambling stages share one control word.

In contrast, a head-end using a code book and a control word generating function for provisioning control words to the receiver may easily provide two (or more) keys to cascaded (de)scrambling blocks such as the stream and block cipher in the DVB-CSA or a descrambling system wherein the DVB-CSA is cascaded with a further (de)scrambling block associated for example with the Advanced Encryption Standard (AES). Such functionality may be easily implemented by using control word request messages comprising two or more references to two or more different control words in the control word matrix. That way one control word request allows the provisioning of two or more control words to the receiver.

The code book may also be used in the provisioning of keys to other functional modules used in the head-end for generating a scrambled data stream. In one embodiment for example the code book may also comprise watermark information for use in a watermark insertion module which is configured to insert the watermark information in predetermined parts of the scrambled data.

Figure 10:
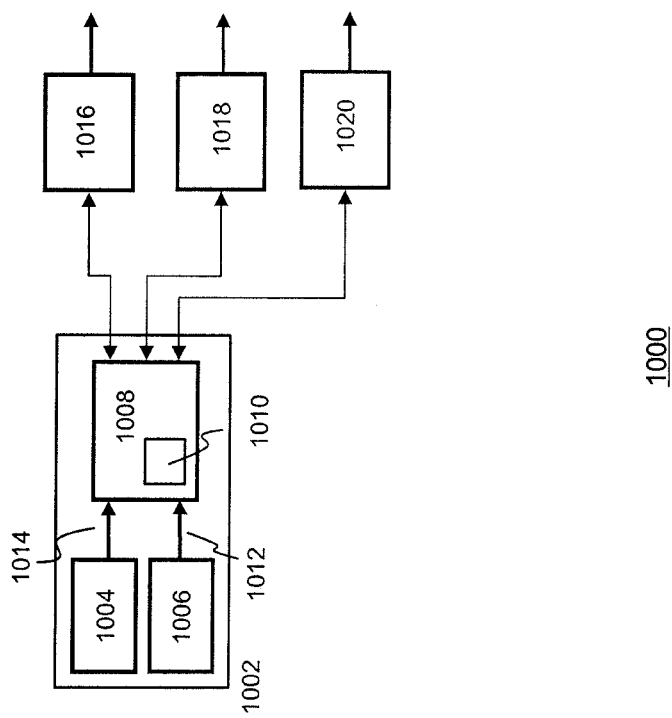
FIG. 10 depicts a schematic of system comprising a plurality of CA systems according to one embodiment of the invention.

FIG. 10 illustrates a system 1000 according to one embodiment of the invention comprising a number of different Conditional Access (CAS) systems 1016, 1018, 1020 each providing CAS services to receiver platforms using the control word update cycle according to the invention. In this embodiment, the CA systems may be centrally provisioned with code books and, optionally, with CP schedules using a central synchronizer 1008 connected to a code book generator 1004 and a CP scheduler 1006. The code book generator and CP scheduler may generate code books 1014 and CP schedules 1012 respectively for each CA system connected to the synchronizer. For efficient provisioning code books and/or CP schedules (or parts thereof) may be shared between two or more CA systems. The CA Systems share a common set of generating functions for the appropriate processing code books and/or CP schedule information. The central synchroniser ensures that all CA systems involved, support the methods for processing code books and/or CP schedules.

It is to be understood that any feature described in relation to any one embodiment may be used alone, or in combination with other features described, and may also be used in combination with one or more features of any other of the embodiments, or any combination of any other of the embodiments. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Moreover, the invention is not limited to the embodiments described above, which may be varied within the scope of the accompanying claims without departing from the scope of the invention.

What is claimed is:

1. A method of generating a scrambled data stream comprising one or more service streams, the method comprising:
   in response to a crypto period schedule and a code book comprising code information associated with one or more control words for scrambling data in one or more service streams, a synchronizer sending a control word update message for controlling at least one crypto period in at least one of said service streams, to a processor, said at least one crypto period defining a valid period for at least one control word;
   in response to said control word update message, said processor generating, on the basis of said code information, said at least one control word associated with said at least one crypto period in said at least one service stream; and,
   scrambling data associated with at least one of said service streams using said control word.

2. The method according to claim 1, wherein said control word update message comprises at least one reference including either one or more of at least one crypto period identifier and a service stream identifier.

3. The method according to claim 1, said method further comprising:
   sending said scrambled data and said code book to one or more receivers.

4. The method according to claim 3, wherein the sending said scrambled data and said code book comprises sending the said scrambled data and said code book in encrypted form to the one or more receivers.

5. The method according to claim 1, said method further comprising: sending said control word update message to one or more receivers.

6. The method according to claim 1, said method further comprising:
   providing the crypto period schedule comprising scheduling information associated with crypto period transitions in at least one of said service streams;
   determining on the basis of timing information in said scrambled data stream and said crypto period schedule a crypto period transition in a service stream; and
   generating on the basis of said determined crypto period transition the control word update message.

7. The method according to claim 6, said method further comprising:
   sending said crypto period schedule to one or more receivers.

8. The method according to claim 6, wherein the determining a crypto period transition in a service stream comprises:
   determining, on the basis of time stamps in said scrambled data stream and said crypto period schedule, the crypto period transition in the service stream.

9. The method according to claim 1, wherein said code book comprises code information for generating control words associated with each or at least a predetermined number of service streams in said data stream and/or for generating control words associated with subsequent crypto periods in at least one service stream or wherein said code book comprises code information for generating a control word matrix, each control word entry in said control word matrix being associated with at least one service stream in said data stream and at least one crypto period in said service stream or wherein said code book comprises code entries for generating a control word matrix on the basis of a predetermined function.

10. The method according to claim 9, wherein said code book comprises the code entries for generating the control word matrix on the basis of a pseudo random number generation function.

11. The method according to claim 1, comprising generating said control word update message on the basis of said code book and the crypto period schedule, said code book comprising code information for determining control words for each or for at least part of the service streams in said data stream and said crypto period schedule comprising timing information associated with crypto period transitions in each or at least part of said service streams.

12. The method according to claim 1, wherein the duration of one or more crypto periods in at least one service stream varies in time either randomly or according to a predetermined function.

13. A computer system for generating a scrambled data stream comprising:
   a processor configured for:
      generating one or more code books, a code book comprising code information for scrambling data in at least one of one or more service streams, and
      generating, in response to a control word update message, one or more control words for scrambling data in said service stream, said control word being generated on the basis of at least part of said code information;
   a synchronizer for sending, in response to the one or more code books and a crypto period schedule, the control word update message associated with at least one crypto period in at least one service stream to the processor.

14. The system according to claim 13, wherein said system further comprises:
   a crypto period scheduler for generating one or more crypto period schedules, said crypto period schedule comprising scheduling information associated with crypto period transitions in at least one of said service streams; and
   a timing filter for determining timing information associated with said scrambled data stream, wherein the system generates the control word update message associated with a crypto period and a service stream on the basis of said timing information and said crypto period schedule.

15. A crypto period controller for use in a system according to claim 14, said crypto period controller comprising:
   an input for receiving at least one crypto period schedule and timing information associated with a scrambled data stream comprising one or more service streams;
   a memory for storing said crypto period schedule, said crypto period schedule comprising schedule information associated with crypto period transitions in at least one of said service streams; and,
   a processor for generating a control word request associated with a crypto period and a service stream on the basis of said timing information and said crypto period schedule.

16. A control word generator for use in a system according to claim 13, said control word generator comprising:

an input for receiving a code book and a control word request, said control word request comprising at least a reference to a crypto period;

a memory for storing said code book, said code book said code book comprising code information for scrambling one or more service streams in a data stream; and, a processor for generating a control word on the basis of said code book and said control word request generated by said first processor.

17. A crypto period controller for use in a system according to claim 16, said crypto period controller comprising:

an input for receiving at least one crypto period schedule and timing information associated with a scrambled data stream comprising one or more service streams;

a memory for storing said crypto period schedule, said crypto period schedule comprising schedule information associated with crypto period transitions in at least one of said service streams; and, a processor for generating a control word request associated with a crypto period and a service stream on the basis of said timing information and said crypto period schedule.

18. A control word data structure for use in a system for generating a scrambled data stream, said data structure comprising code entries, wherein when stored in a memory of a processor, said code entries allowing the processor to generate at least part of a control word matrix comprising control words associated with a predetermined number of subsequent crypto periods in each service stream of a multi-program transport stream.

19. A computer program product, the computer program product comprising software code portions stored on a non-transitory computer readable medium, the software code portions, when executed by a processor, perform a method of generating a scrambled data stream comprising one or more service streams, the method comprising:

in response to a crypto period schedule and a code book comprising code information associated with one or more control words for scrambling data in one or more service streams, sending a control word update message associated with at least one crypto period in at least one of said service streams, said at least one crypto period defining a valid period for at least one control word;

in response to said control word update message, generating on the basis of said code information said at least one control word associated with said at least one crypto period in said at least one service stream; and, scrambling data associated with at least one of said service streams using said control word.

20. The computer program product according to claim 19, wherein said control word update message comprises at least one reference including either one or more of at least one crypto period identifier and/or a service stream identifier.

21. The computer program product according to claim 19, said method further comprising:

sending said scrambled data and said code book to one or more receivers.

22. The computer program product according to claim 21, wherein the sending said scrambled data and said code book comprises sending the said scrambled data and said code book in encrypted form to the one or more receivers.

23. The computer program product according to claim 19, said method further comprising:

sending said control word update message to one or more receivers.

24. The computer program product according to claim 19, said method further comprising:

providing the crypto period schedule comprising scheduling information associated with crypto period transitions in at least one of said service streams;

determining on the basis of timing information in said scrambled data stream and said crypto period schedule a crypto period transition in a service stream; and generating on the basis of said determined crypto period transition the control word update message.

25. The computer program product according to claim 24, said method further comprising:

sending said crypto period schedule to one or more receivers.

26. The computer program product according to claim 24, wherein the determining a crypto period transition in a service stream comprises:

determining, on the basis of time stamps in said scrambled data stream and said crypto period schedule, the crypto period transition in the service stream.

27. The computer program product according to claim 19, wherein said code book comprises code information for generating control words associated with each or at least a predetermined number of service streams in said data stream and/or for generating control words associated with subsequent crypto periods in at least one service stream or wherein said code book comprises code information for generating a control word matrix, each control word entry in said control word matrix being associated with at least one service stream in said data stream and at least one crypto period in said service stream or wherein said code book comprises code entries for generating a control word matrix on the basis of a predetermined function.

28. The computer program product according to claim 27, wherein said code book comprises the code entries for generating the control word matrix on the basis of a pseudo random number generation function.

29. The computer program product according to claim 19, wherein the method comprises generating said control word update message on the basis of said code book and a crypto period schedule, said code book comprising code information for determining control words for each or for at least part of the service streams in said data stream and said crypto period schedule comprising timing information associated with crypto period transitions in each or at least part of said service streams.

30. The computer program product according to claim 19, wherein the duration of one or more crypto periods in at least one service stream varies in time either randomly or according to a predetermined function.

* * * * *